Figure 1:
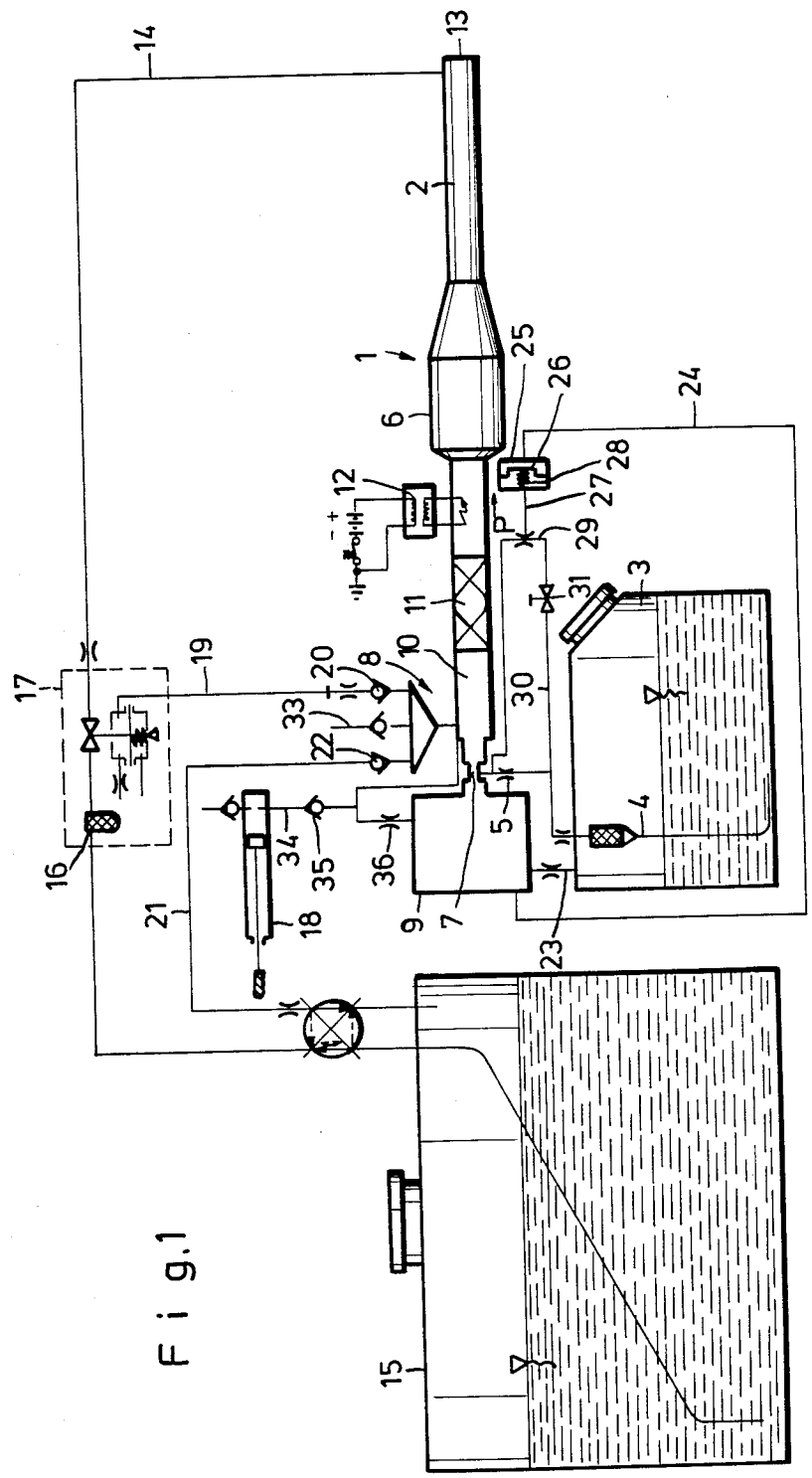

United States Patent [19]

Roth

[11] Patent Number: 4,622,003

[45] Date of Patent: Nov. 11, 1986

[54] APPARATUS FOR DISPENSING ACTIVE MATERIALS

[75] Inventor: Paul Roth, Isny/Allgäu, Fed. Rep. of Germany

[73] Assignee: MOTAN Gesellschaft mit beschränkter Haftung, Isny, Fed. Rep. of Germany

[21] Appl. No.: 659,659

[22] Filed: Oct. 11, 1984

[30] Foreign Application Priority Data

Oct. 13, 1983 [DE] Fed. Rep. of Germany ....... 3337191

[51] Int. Cl.⁴ .......................................... F23C 11/04
[52] U.S. Cl. ........................................ 431/1; 431/12; 431/61
[58] Field of Search ...................... 431/1, 6, 12, 38, 61

[56] References Cited

U.S. PATENT DOCUMENTS

| | | | |
|---|---|---|---|
| 1,604,159 | 10/1926 | Foersterling | 431/12 |
| 2,217,518 | 10/1940 | Markt | 431/12 |
| 2,838,102 | 6/1958 | Reiners | 431/1 |
| 2,911,788 | 11/1959 | Lewis et al. | 431/1 X |
| 2,959,214 | 11/1960 | Durr et al. | 431/1 |
| 3,123,027 | 3/1964 | Livingston | 431/12 X |
| 3,169,570 | 2/1965 | Hoag et al. | 431/1 |
| 3,233,650 | 2/1966 | Cleall | 431/1 |
| 3,241,597 | 3/1966 | Juzi | 431/12 X |

Primary Examiner—Larry Jones
Attorney, Agent, or Firm—Becker & Becker, Inc.

[57] ABSTRACT

An apparatus for dispensing active material. The apparatus oscillating burner, a tank for the active material which is connected to a discharge line, and a fuel reservoir which, via a suction line, feeds the oscillating burner, which operates with pulsating combustion and comprises an oscillating tube. If the pressure drops in the oscillating burner, it is possible to introduce additional fuel thereinto with the aid of a control device as a function of the pulsation pressure of the oscillating burner. The control device causes extra fuel to be supplied to ensure that the resonance range, which has originally been set to no-load, is restored, any pressure loss caused by the feeding of active material being compensated for so as not to affect the resonance behavior of the apparatus, and consequently the quality of the dispensed active material.

11 Claims, 3 Drawing Figures

APPARATUS FOR DISPENSING ACTIVE MATERIALS

BACKGROUND OF THE INVENTION

1. Field of the Invention

The present invention relates to an apparatus for dispensing active substances or materials, and in particular to a portable spraying apparatus having an oscillating fire burner which operates with pulsating combustion and has an oscillating tube, a tank for the active material and a discharge line connected thereto, and a fuel reservoir which feeds the burner via a suction line.

2. Description of the Prior Art

With one known apparatus of this type, the active material is atomized by means of a pulsating gas column in the oscillating tube and is then ejected from the latter. The fuel is hurled backwards from the oscillating tube during the backward oscillations, is collected in a turbulence chamber, and is thereafter hurled back again from this chamber. The excessive pressure formed during the repulsion of the pulsating gas column in the turbulence chamber is passed into the fuel reservoir, so that a pressure builds up therein. The feeding of the fuel into a mixing neck of the oscillating fire burner, in which the fuel is mixed with air, is effected as a function of this pressure. The fuel/air mixture is ignited in the following combustion chamber. At the end of the oscillating tube, there is fed to the pulsating gas mixture the active material, which is usually mixed with water or oil. Since these carrier media for the active material are cooler than the hot pulsating gas column, heat is extracted from the latter, causing the pulsating frequency of the gas column to drop. Since the oscillation system has been set at no-load, that is to say without the supply of any active material, in such a way that the gas column operates at maximum pressure in the resonance range, the pressure drops as a result of the heat extraction. This also causes the output of the apparatus to be reduced. The constant flowing-in of the active material furthermore causes the mass of the gas column to be increased, which may also lead to disturbance of the inherent frequency of the gas column. These mechanical and thermodynamic influences cause the gas column to be removed from the resonance range to such a considerable extent that the apparatus gets out of step or cycle, causing the active material to be no longer dispensed in a uniformly distributed manner. The reduction of the frequency of the gas column leads to a pressure drop in the oscillation system, and consequently to a reduction of the fuel supply. The apparatus is then interrupted because the fuel supply is too low, and therefore has to be re-started, which is complicated and leads to an undesirable loss of time, the more so since the apparatus is intended for continuous operation.

An object of the present invention is to develop an apparatus of the aforementioned general type in such a way that the impairment of the frequency of the gas column as a result of the active material input does not affect the operation of the apparatus nor the active material discharge.

BRIEF DESCRIPTION OF THE DRAWINGS

This object, and other objects and advantages of the present invention, will appear more clearly from the following specification in conjunction with the accompanying drawings, in which:

FIG. 1 schematically illustrates one embodiment of the apparatus according to the present invention; and FIGS. 2 and 3 each schematically show another embodiment of the apparatus according to the present invention.

SUMMARY OF THE INVENTION

The present invention is characterized primarily by a control device which is operable to feed additional fuel to the oscillating fire burner in response to a drop in the pulsation pressure of the oscillating fire burner.

By this means additional fuel is fed to the oscillating fire burner with the aid of the control device due to the pressure drop occurring when the active material is introduced. This causes the pressure in the oscillating fire burner to be increased, and the pressure drop to be, at least approximately, compensated for, so that the apparatus again operates at optimum pressure conditions in the resonance range. The inventive apparatus therefore operates at maximum efficiency and with a continuous and uniform discharge of the active material. The control device thus causes the resonance range, which was originally set to no-load, to be restored, so that any disturbance caused by the active material supply does not affect the resonance behavior of the apparatus, and hence the quality of the dispensed active material. The operation of the apparatus is therefore quiet and constant. Since the control device operates as a function of the pulsation pressure of the oscillating fire burner, the quantity of additional fuel fed is always only such as is necessary for maintaining the optimum working range of the apparatus.

Pursuant to further specific features of the present invention, the control device may have at least one valve, which is located in a fuel supply line of the control device. The fuel supply line may be a by-pass line of the suction line. The valve may be actuatable by an actuating member which is movable in response to the pulsation pressure. The actuating member may be located in a line connected to a source of compressed air. The compressed air line may connect the actuating member to the fuel reservoir.

The oscillating fire burner may be connected to a turbulence chamber which is connected to the fuel reservoir via a connecting line. The compressed air line may connect the actuating member to the turbulence chamber.

The actuating member may comprise a diaphragm which is connected to a valve tappet of the valve. A second valve, preferably a two-way valve, may be located in the fuel supply line. The second valve may be located upstream of the first valve in the flow direction of the fuel.

DESCRIPTION OF PREFERRED EMBODIMENTS

Referring now to the drawings in detail, the apparatuses shown in FIGS. 1 to 3, which are designed as spraying and atomizing apparatuses, comprise an oscillating fire burner 1 which is provided with a cylindrical oscillating tube 2, and operates with pulsating combustion. For pulsating combustion in the combustion chamber 6, fuel is fed from a fuel reservoir 3, via a suction line 4 and a metering device 5, which is designed as a throttle, to a carburetor 8 via a two-way nozzle 7 having an atomizing nozzle (not shown). The carburetor 8 has a valve chamber (not shown in detail), which communicates with a turbulence chamber 9 via the two-way nozzle, and a mixing neck 10 adjoining the valve chamber. The fuel which is thrown or hurled back during the pulsating combustion is collected in the turbulence chamber 9 and, when the oscillation occurs in the opposite direction, is hurled back therefrom in the direction of the oscillating tube, so that the turbulence chamber forms a kind of calming-down chamber, in which fuel is collected. When the fuel/air mixture, which is formed by mixing the fuel with air fed to the mixing neck 10 via the line 33, passes a baffle 11 provided in the mixing neck, it is ignited by an ignition coil 12 provided in the mixing neck and is burned in a pulsating manner. Directly before the free end 13 of the oscillating tube 2, there opens out a discharge line 14, by means of which active material on an oil or water base is fed from a tank 15. The active material passes through a sieve 16 provided in the discharge line 14; also connected to the discharge line is an emergency shut-down system 17.

There usually prevails in the turbulence chamber 9 an excess pressure which is produced, prior to the start-up of the oscillating fire burner 1, by means of an air pump 18. This pump is connected to the turbulence chamber 9 via a line 34, in which are arranged a non-return or check valve 35 and a throttle 36. The excess pressure is also built up in the fuel reservoir 3 via the connecting line 23 of the turbulence chamber 9 and of the reservoir 3, causing fuel to be conveyed into the mixing neck 10 via the suction line 4. The carburetor 8 is connected to the emergency shut-down system 17 via a line 19, in which a non-return or check valve 20 is located. The valve 20 opens in the direction of the emergency shut-down system 17, so that the supply of the active material is interrupted via the emergency shut-down system when a specific excess pressure is reached in the carburetor.

The active material tank 15 is connected via a line 21 with a valve chamber valve 22 which is opened for producing a sufficient excess pressure in the active material tank when the repulsion pressure is formed during the combustion process. The valve 22 is preferably a non-return or check valve which opens in the direction of the active material tank 15, and which, when a pressure drop in the oscillating burner system occurs, ensures that the excess pressure which is necessary for discharge of the active material is maintained in the active material tank in such a case.

The performance of the combustion chamber 6 of the oscillating fire burner 1 is pressure-dependent, because fuel is fed to the two-way nozzle 7 as a function of the pressure prevailing in the fuel reservoir via the turbulence chamber 9 and the connecting line 23 which connects this chamber to the fuel reservoir 3. The oscillation of the burner, and the oscillating gas column formed thereby, cause the active material fed via the line 14 to be atomized and dispensed. The apparatus is adjusted in such a way that the oscillating gas column operates in the resonance range under no-load, namely without the supply of the active material. In this range, the apparatus operates at maximum pressure. When the active material is introduced into the oscillating tube 2, the oscillating system is disturbed. Heat is extracted from the oscillating gas column by the cooler active material liquid, thus causing the frequency in the resonance system to drop. The heat extraction is particularly considerable if water is used as the carrier medium for the active material. The pressure thus drops in the entire system. Since the apparatus then no longer operates in the resonance range, its capacity or performance drops. The pressure drop may be further increased by the mass of the active material. The constant flowing of the active material into the oscillating tube 2 causes the mass of the oscillating gas column to be changed independently of the frequency. This may lead to disturbance of the inherent frequency of the gas column in the resonance range. Both influences, namely the heat extraction and the mass increase, may cause the frequency of the oscillating system to drop so considerably that the apparatus leaves the optimum resonance range and gets out of cycle or is even stopped. As a result, the active material is no longer discharged uniformly and continuously.

In order to avoid this, the turbulence chamber 9 is connected via a compressed-air line 24 to a diaphragm-type switch 25. The latter is provided with a diaphragm 26 which is connected to an adjustment member 27 which is designed as a valve tappet and which, at normal pressure, i.e. when there is pressure in the system, when the system operates in the resonance range, is held in the closed position (FIG. 1) against the force exerted by a spring 28. The adjustment member 27 actuates a valve 29 which is located in a by-pass line 30 of the suction line 4. Located upstream of the valve 29 in the by-pass line is disposed a second valve 31. If, when the active material is added, the pressure should drop in the turbulence chamber 9 and in the fuel reservoir 3, and the apparatus leaves the resonance range, this pressure drop affects the diaphragm 26 via the line 24. Because of the pressure drop, the diaphragm can be deflected to the right by the spring 28 in the direction of the arrow P in FIG. 1. In so doing, the diaphragm takes along the adjustment member 27, causing the valve 29 to be opened. As a result, it is possible to feed additional fuel to the fuel conveyed from the suction line 4 via the by-pass line 30 behind the metering device 5 into the two-way nozzle 7. This additional fuel supply causes the pressure in the combustion chamber 6 to be increased again, and the pressure drop to be compensated, so that the desired optimum pressure conditions prevail, at which the apparatus operates in the resonance range. The pressure drop can thus automatically be compensated for in a satisfactory manner, so that a maximum efficiency of the apparatus, and a uniform and continuous discharge of the active material, are ensured. Depending upon the pressure drop, the deflection of the diaphragm 26 varies, so that the actually required quantity of fuel is fed via the by-pass line 30. If the pressure drop becomes less or even ceases when the active material is introduced into the oscillating tube 2, the diaphragm 26 is deflected in the direction opposite to the arrow P as a result of the higher pressure, thus causing the valve 29 to be shut again. The fuel is then fed only via the suction line 4.

In order not to adversely affect the starting conditions when the apparatus is started, additional fuel is prevented from being introduced into the mixing neck 10 via the by-pass line 30 by shutting the second valve 31.

Figure 2:
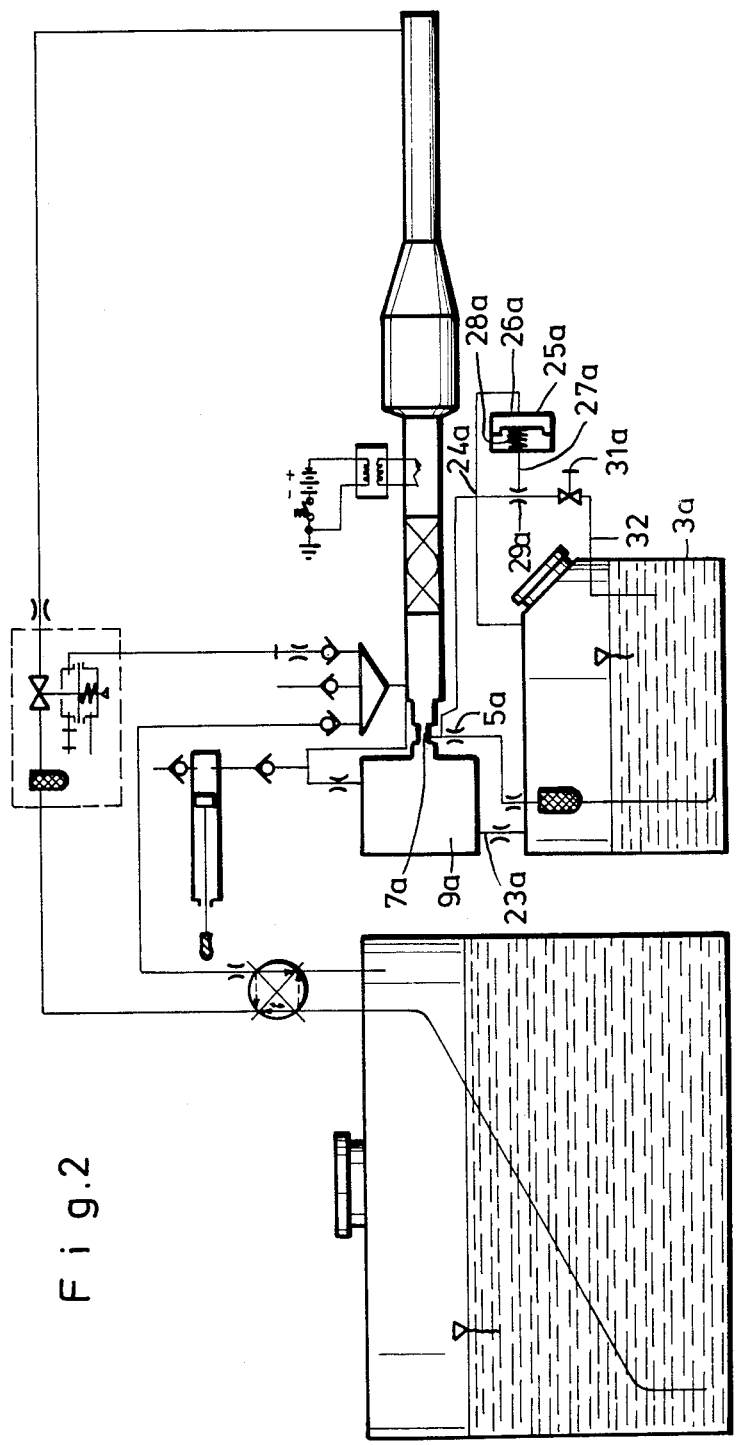

In the embodiment illustrated in FIG. 2, a supply line 32 which opens directly into the fuel reservoir 3a is provided instead of the by-pass line 30. The valves 29a and 31a are provided in this line 32; the valve 29a is actuated by the diaphragm switch 25a which has the diaphragm 26a. The diaphragm switch 25a is connected to the fuel reservoir 3a via the pressure line 24a. A pressure drop in the oscillation system becomes noticeable in the fuel reservoir 3a via the turbulence chamber 9a and the connection line 23a. In conformity therewith, the pressure in the supply line 32, and consequently that in the diaphragm switch 25a, also drops. The spring 28a can therefore deflect the diaphragm 26a to the right in FIG. 2 in the described manner. The valve 29a is opened via the adjustment member 27a connected to the diaphragm 26a, so that additional fuel can be fed into the two-way nozzle 7a via the supply line 32 behind the metering device 5a.

In this embodiment, also, the fuel supply is thus automatically adapted to the pressure conditions in the oscillation system. In other respects, this exemplary embodiment is constructed in the same way as the embodiment shown in FIG. 1.

Figure 3:
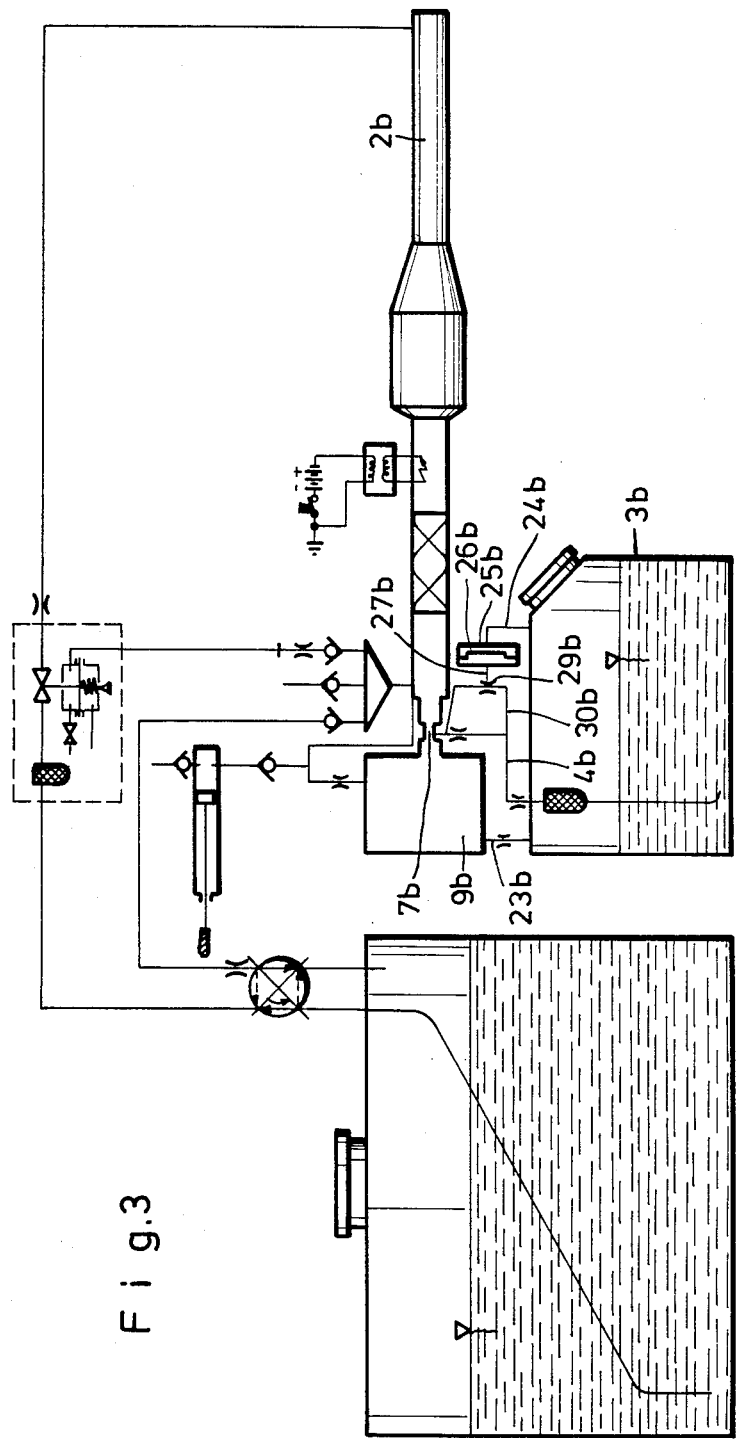

In the embodiment illustrated in FIG. 3, the valve 29b is located in the by-pass line 30b of the suction line 4b in conformity with the embodiment of FIG. 1. The valve 29b is actuated by the adjustment member 27b of the diaphragm switch 25b, which is connected to the fuel reservoir 3b via the line 24b. If a pressure drop occurs as the active material is introduced into the oscillating tube 2b, it is sensed by the diaphragm switch 25b via the turbulence chamber 9b, the connecting line 23b, the fuel reservoir 3b, and the line 24b. The diaphragm 26b is deflected in the described manner, and the valve 29b is opened via the adjustment member 27b. In addition to the fuel in the suction line 4b, fuel then flows from the suction line 4b via the by-pass line 30b to the two-way nozzle 7b. In other respects, the embodiment shown in FIG. 3 corresponds to the exemplary embodiment shown in FIG. 1.

In the embodiments illustrated in FIGS. 2 and 3, the pressure lines 24a and 24b of the diaphragm switches 25a and 25b respectively open into the fuel reservoirs 3a and 3b respectively. Since a relatively large air space is provided in the reservoir above the active material, the pressure changes in the oscillation system do not have a sudden effect on the diaphragm switch 25a or 25b. The air space acts rather as an abating space, by means of which a certain pressure compensation takes place. The control of the additional fuel supply is therefore effected more slowly than is the case with the embodiment of FIG. 1. Pressure fluctuations which occur only for a short time therefore do not cause the diaphragm 25a or 25b to respond, whereby a uniform operation of the apparatus is achieved.

The present invention is, of course, in no way restricted to the specific disclosure of the specification and drawings, but also encompasses and modifications within the scope of the appended claims.

I claim:

1. An apparatus for dispensing active material, said apparatus for portable spraying having an oscillating fire burner which operates with pulsating combustion and has an oscillating tube with a pulsating gas column operable in a resonance range at a predetermined pulsation pressure of said burner to which said active material is supplied via a discharge line from a tank for said active material; fuel being supplied to said burner from a fuel reservoir via a suction line;

the improvement therewith comprising: a control device operatively connected to provide a further fuel connection between said fuel reservoir and said burner to feed additional fuel to the latter in response to heat extraction from the pulsating gas column causing a drop in the pulsation pressure of said burner and to compensate for the pressure drop so that desired optimum pressure conditions prevail at which the apparatus operates in the resonance range and so that a maximum efficiency of the apparatus and a uniform and continuous dispensing of the active material are ensured.

2. An apparatus according to claim 1, in which said control device includes a fuel supply line in which is disposed at least one first valve.

3. An apparatus according to claim 2, in which said fuel supply line is a by-pass line of said suction line.

4. An apparatus according to claim 2, in which said control device includes an actuating member for actuating said first valve; said actuating member is movable in response to the pulsation pressure of said burner.

5. An apparatus according to claim 4, which includes a line which is connected to a source of compressed air; said actuating member is disposed in said last-mentioned line.

6. An apparatus according to claim 5, in which said compressed-air line connects said actuating member to said fuel reservoir.

7. An apparatus according to claim 5, which includes a turbulence chamber which is connected to said burner, and is connected to said fuel reservoir via a connecting line; said compressed-air line connects said actuating member to said turbulence chamber.

8. An apparatus according to claim 5, in which said first valve includes a valve tappet; and in which said actuating member includes a diaphragm which is connected to said valve tappet.

9. An apparatus according to claim 8, which includes a second valve disposed in said fuel supply line.

10. An apparatus according to claim 9, in which said second valve is a two-way valve.

11. An apparatus according to claim 9, in which said second valve is located upstream of said first valve in the direction of flow of said fuel.

* * * * *